(12) United States Patent
Logel

(10) Patent No.: US 6,364,512 B1
(45) Date of Patent: Apr. 2, 2002

(54) LIGHT HOUSING

(75) Inventor: Valere Logel, Paris (FR)

(73) Assignee: Sidler GmbH & Co., Tuebingen (DE)

( * ) Notice: Subject to any disclaimer, the term of this patent is extended or adjusted under 35 U.S.C. 154(b) by 0 days.

(21) Appl. No.: 09/560,778

(22) Filed: Apr. 28, 2000

(30) Foreign Application Priority Data

Jun. 15, 1999 (DE) .......................................... 199 27 141

(51) Int. Cl.$^7$ .............................................. F21V 21/00
(52) U.S. Cl. ...................... 362/490; 362/549; 362/548; 362/396; 362/365
(58) Field of Search ................................ 362/548, 549, 362/396, 147, 490, 365, 455

(56) References Cited

U.S. PATENT DOCUMENTS

| | | | | |
|---|---|---|---|---|
| 5,239,449 A | * | 8/1993 | Wnuck et al. ................. | 362/80 |
| 5,357,408 A | * | 10/1994 | Lecznar et al. ............... | 362/74 |
| 5,681,105 A | * | 10/1997 | Nau ............................. | 362/153 |
| 5,826,970 A | * | 10/1998 | Keller et al. ................. | 362/147 |
| 6,015,222 A | * | 1/2000 | Schindler ..................... | 362/490 |
| 6,019,487 A | * | 2/2000 | Fornell ........................ | 362/368 |
| 6,022,131 A | * | 2/2000 | Morimoto et al. ........... | 362/549 |
| 6,092,916 A | * | 7/2000 | Davis, Jr. et al. ........... | 362/490 |
| 6,217,189 B1 | * | 4/2001 | Nassim ....................... | 362/147 |

FOREIGN PATENT DOCUMENTS

| | | |
|---|---|---|
| DE | 19724664 A1 | 12/1998 |
| EP | 0524830 A2 | 1/1993 |

* cited by examiner

*Primary Examiner*—Sandra O'Shea
*Assistant Examiner*—Anabel M Ton
(74) *Attorney, Agent, or Firm*—Walter A. Hackler

(57) ABSTRACT

In a light housing (1) for the installation into a mounting opening (2), in particular for a light in a motor vehicle, with an angle bracket (9), which is slidable onto a wall section (16) of the mounting opening (2) with the holding receptacle (10), the light disk (5) is insertable into the remaining opening with the angle bracket being slid on, where the inserted light disk (5) grips around the angle bracket (9) and also grips around a wall section (26) of the mounting opening (2) approximately on the opposite side. Only two installation steps are necessary for mounting the light housing (1) i.e., sliding of the holding receptacle (9) onto the wall section (16) and inserting the light disk (5).

14 Claims, 3 Drawing Sheets

LIGHT HOUSING

This application claims Paris Convention priority of German patent application number 199 27 141.0 filed Jun. 15, 1999 the complete disclosure of which is hereby incorporated by reference.

BACKGROUND OF THE INVENTION

The invention relates to a light housing for the installation in a mounting opening, particularly for a light in a motor vehicle, with an angle bracket, which is slidable onto a wall section of the mounting opening with a holding receptacle, and with a light disk.

Such a light housing became known in the art for example by EP 0 524 830 A2.

The frame-shaped light housing known from the EP 0 524 830 A2 is fixed in a quadratic mounting opening in the headliner of a dome of a motor vehicle by gripping the headliner from behind on two opposite sides and by being adjacent to the inside of the headliner facing the user. For that purpose the light housing comprises on one side a holding receptacle designed as a retaining slot and on the opposite side a rocking lever lock, the rocking lever of which is pivotably connected at the light housing by a living hinge. If the light housing is slid onto the headliner with the retaining slot, and if it is also adjacent to the inside of the headliner on the opposite side, the rocking lever is pivoted in its latched position and is locked in that position. Afterwards, the frame opening of the light housing is closed by a light disk.

Hence, in installing this known light housing, only three installation steps are necessary, i.e. sliding of the receiving slot onto the wall of the headliner, locking of the lever and inserting the light disk. If the living hinge is destroyed, the entire light housing has to be exchanged.

The object of the present invention is to further simplify the installation of a light housing of the aforementioned type.

SUMMARY OF THE INVENTION

According to the invention, this object is solved in that the light disk is insertable into the remaining opening with the angle bracket being slid on and in that the inserted light disk grips around the angle bracket and also grips around a wall section of the mounting opening approximately on the opposite side.

The advantage obtained with the invention consists in using the light disk for fastening or securing the light housing at the headliner. For the installation of the light housing according to the invention only two mounting steps are necessary, i.e. sliding of the holding receptacle onto the wall section, for example onto the headliner, and inserting the light disk. The light disk can for example be a lens.

A lamp-socket for the lamp of the light housing is provided at the light disk or in preferred embodiments at the angle bracket, for example by plugging contacts of the lamp-socket in corresponding openings. In the simplest case, the lamp can be clamped between these contacts.

In preferred embodiments of the invention a catch is provided at the light disk, with said catch the inserted light disk grips behind the angle bracket in its direction of insertion and a bearing surface is provided with said bearing surface the inserted light disk abuts the angle bracket in its direction of insertion. The light disk grips around the angle bracket from both sides with the catch and bearing surface, thus the light disk is held at the angle bracket in its direction of insertion. In particular, the bearing surface prevents inserting the light disk into the mounting opening beyond the desired mounting position.

Preferably, the light disk is elastically deformable at least in its section gripping around the angle bracket. Thus, when gripping around the wall section of the mounting opening with one side already, the light disk can also be inserted into the remaining opening with its opposite side and it can be deformed for gripping around the angle bracket.

The angle bracket as well as the light disk may be a plastic part, in particular an injection moulded part.

If the light disk is inserted into the remaining opening essentially without lateral clearance, the angle bracket is secured against lateral movement within the mounting opening or at the headliner by the inserted light disk.

Preferably, the holding receptacle of the angle bracket is formed by an approximately u-shaped clamping clip, which can be elastically widened for easier sliding onto the wall of the mounting opening.

In a particularly preferred embodiment, the angle bracket comprises a bearing frame, which, with the angle bracket being slid on, abuts the inside of the wall with a frame section at least with its side opposite the holding receptacle. The bearing frame is held abutting to the headliner on both sides since the inserted light disk grips around the bearing frame also on its side opposite the holding receptacle. Due to this large bearing area of the bearing frame at the headliner, the angle bracket is also fixed in its position.

In an improvement of this embodiment, the light disk may comprise a bearing surface, with said bearing surface it abuts the frame section in its direction of insertion in its inserted state. This bearing surface prevents inserting the inserted light disk beyond the desired mounting position in the mounting opening.

In particularly preferred embodiments, the light disk comprises a holding receptacle, with said holding receptacle the inserted light disk grips around a wall section of the mounting opening. In an advantageous variant, the holding receptacle is for example formed by an approximately u-shaped clamping clip, whereby the holding receptacle is elastically expandable.

Additional advantages of the invention can be gathered from the description and the drawing. Also, the previously mentioned and the following characteristics can be used according to the invention each individually or collectively in any combination. The embodiments shown and described are not to be taken as a conclusive enumeration, but have exemplary character for the description of the invention.

DESCRIPTION OF THE PREFERRED EMBODIMENTS

Figure 1A:
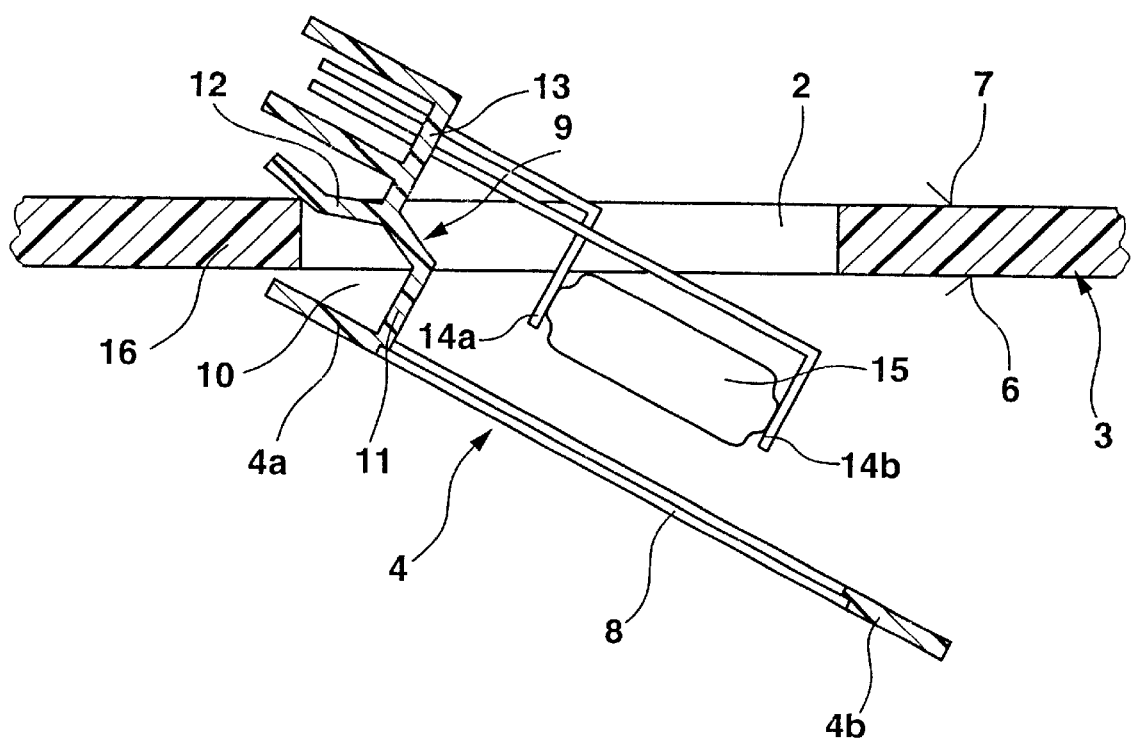
FIG. 1 shows in a sectional view a first example of an embodiment of a light housing in different mounting steps (FIGS. 1a to 1e)
Figure 1B:
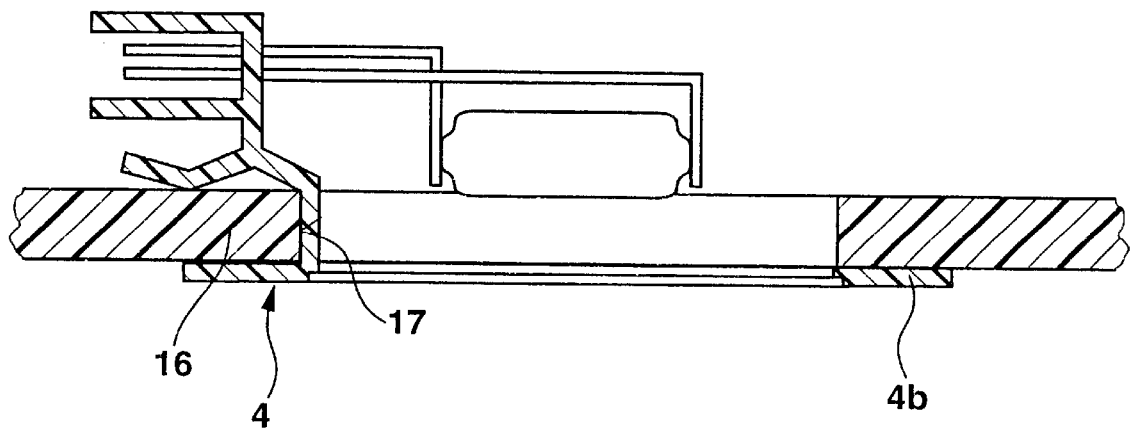

In FIG. 1a a for example rectangular mounting opening in the headliner 3 of a motor vehicle is denoted with 2. In this mounting opening 2 a two-piece light housing 1 (FIG. 1e)

consisting of a bearing frame 4 and a light disk 5 is inserted from the side facing the interior of the car. The inside of the headliner 3 facing the interior of the car is denoted with 6 and the outside is denoted with 7.

As shown in FIG. 1a, the bearing frame 4 comprises a central frame opening 8 and on its one (left) side an approximately u-shaped angle bracket 9 with a holding receptacle 10 open to the side. The holding receptacle 10 consists of a left frame section 4a, a bar 11 and a clamping clip 12 gripping around the left frame section 4a. In a socket shoulder 13 on the clamping clip 12, two contacts 14a and 14b are plugged in, between said contacts is clamped a lamp 15 of the light housing 1.

The bearing frame 4 is inserted transversely in the mounting opening 2 with its left side leading until its clamping clip 12 can grip around the left wall section 16 of the headliner 3 (FIG. 1a). The mounting frame 4 is slid onto the left wall section 16 with its holding receptacle 10 by at the same time pivoting the right frame section 4b to the inside 6, whereby the clamping clip 12 mounted elastically facilitates the sliding on. The mounting position of the bearing frame 4 is reached, if it completely abuts the inside 6 and also if its bar 11 abuts the left limiting wall 17 of the mounting opening 2 (FIG. 1b).

Figure 1C:
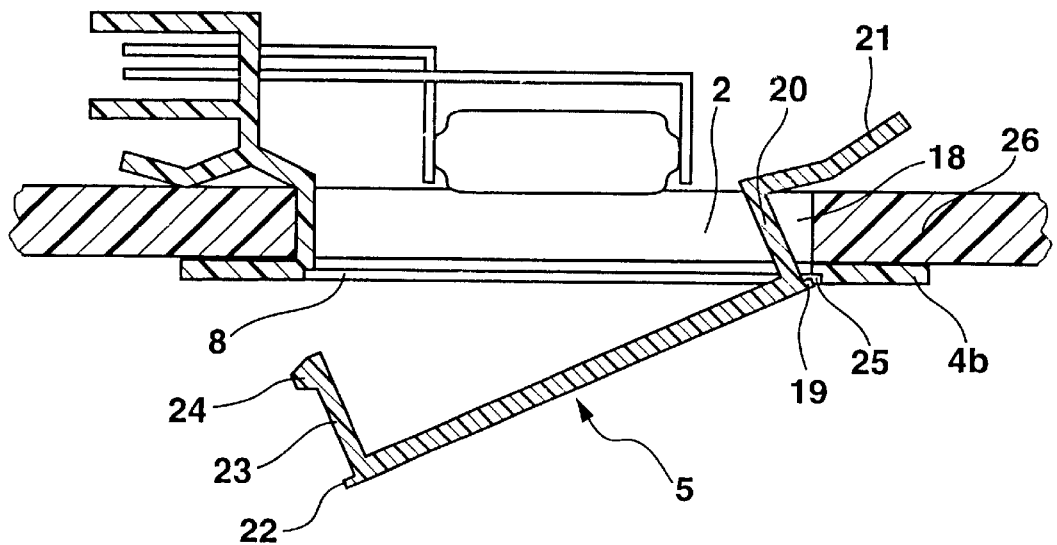

As shown in FIG. 1c, the light disk 5 comprises on its right side a holding receptacle 18, which is defined by a shoulder 19, a bar 20 and a clamping clip 21. A shoulder 22, a bar 23 with a catch 24 are provided on its left side. The light disk 5 is inserted transversely with its right side leading into the frame opening 8 and into the mounting opening 2 until its shoulder 19 touches a corresponding recess 25 of the right frame section 4b and its clamping clip 21 can grip around the right wall section 26 of the headliner 3.

Figure 1D:
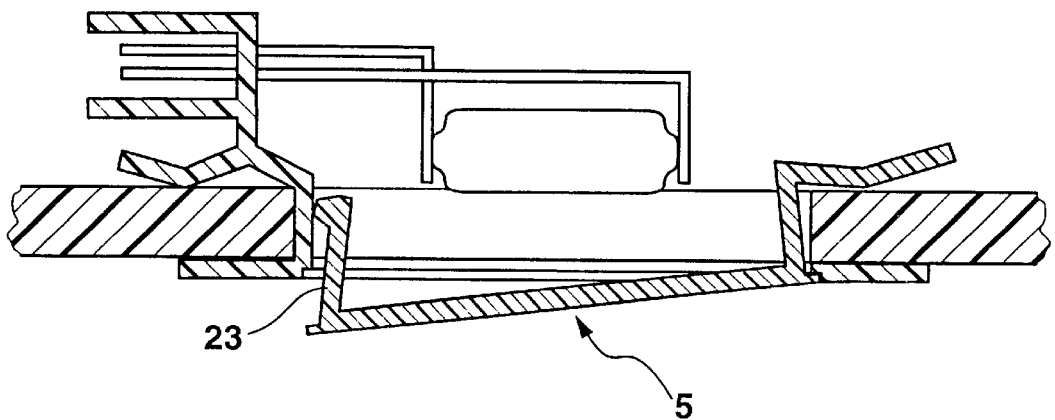
Figure 1E:
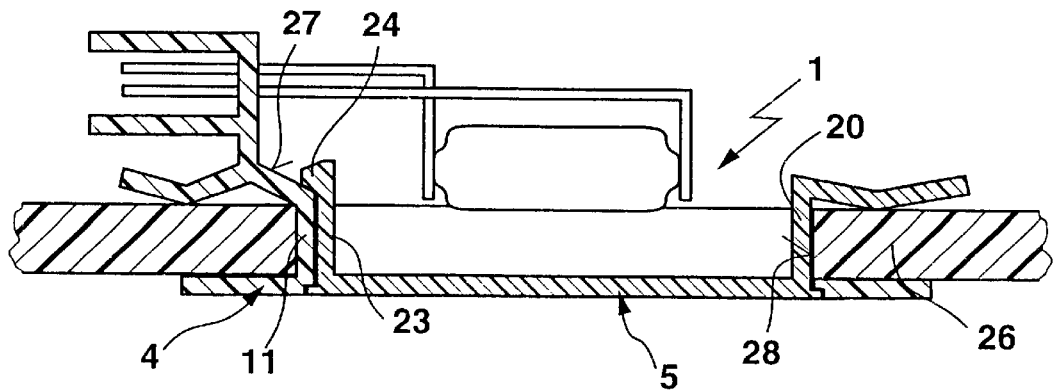

The recess 25 forms a bearing point, around which the light disk 5 is further rotated in clockwise direction (FIG. 1d), until finally the right wall section 26 is completely gripped by the shoulder 19 and clamping clip 21 and the catch 24 is clamped behind an inclined surface 27 on the angle bracket 10 (FIG. 1e). In this final position the light disk 5 abuts with its right bar 20 the right limiting wall 28 and with its left bar 23 to the bar 11 of the angle bracket 9 essentially without lateral clearance. The clipped-in light disk 5 thus not only closes the frame opening 8, but at the same time prevents lateral movement of the angle bracket 9 or of the bearing frame 4.

Figure 2:
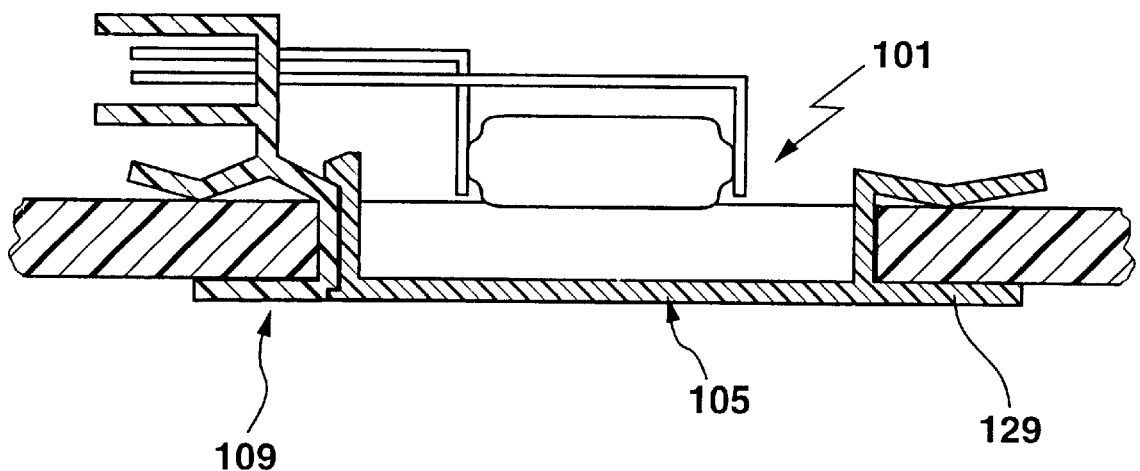
FIG. 2 shows a second example of an embodiment of a light housing in a view corresponding to FIG. 1.

In FIG. 2a different example of an embodiment of a two-piece light housing 101 is shown where no bearing frame, but only an angle bracket 109 is provided. The light disk 105 comprises on its right side a long bearing bar 129 instead of a short shoulder, with said long bearing bar it touches the inside 6 of the headliner. First, the angle bracket and then the light plate 105 are mounted, as in the first example of an embodiment.

Figure 3:
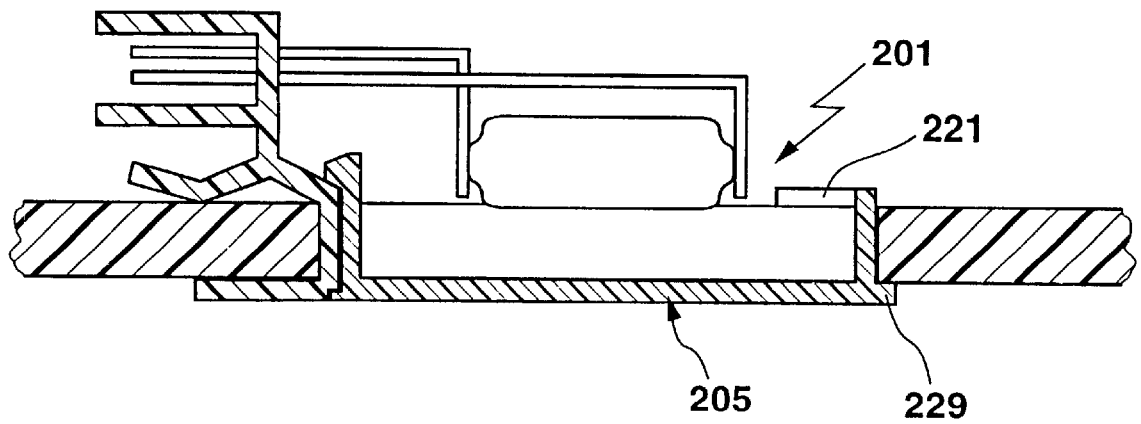
FIG. 3 shows a third embodiment of a light housing in a view corresponding to FIG. 1.

The further light housing 201 shown in FIG. 3 differs from the light housing 101 by the light disk 205, which abuts on the inside 6 with its shoulder 229 and does not grip around the right wall section, but the front and back wall section of the mounting opening 2 with a clamping section 221 each.

I claim:

1. Light housing (1;101;201) for the installation in a mounting opening (2), particularly for a light in a motor vehicle, with an angle bracket (9;109), which is slidable onto a wall section (16) of the mounting opening (2) with a holding receptacle (10), and with a light disk (5;105;205), characterized in that, the light disk (5;105;205) is insertable into the remaining opening with the angle bracket (9;109) being slid on and in so that the inserted light disk (5;105;205) grips around the angle bracket (9;109) and also grips around a wall section (26) of the mounting opening (2) on opposite side and a catch (24) is provided at the light disk (5;105;205), with said catch (24) the inserted light disk (5;105;205) grips behind the angle bracket (9;109) in its direction of insertion.

2. Light housing according to claim 1, characterised in that a lamp socket for a lamp (15) is provided at the angle bracket (9;109) or at the light disk.

3. Light housing (1:101:201) for the installation in a mounting opening (2), particularly for a light in a motor vehicle, with an angle bracket (9;109), which is slidable onto a wall section (16) of the mounting opening (2) with a holding receptacle (10), and with a light disk (5;105;205), characterized in that, the light disk (5;105;205) is insertable into the remaining opening with the angle bracket (9;109) being slid on and in so that the inserted light disk (5;105;205) grips around the angle bracket (9;109) and also grips around a wall section (26) of the mounting opening (2) on an opposite side and the light disk (5;105;205) comprises a bearing surface (shoulder 22), with said bearing surface the inserted light disk (5;105;205) abuts the angle bracket (9;109) in its direction of insertion.

4. Light housing (1;101;201) for the installation in a mounting opening (2), particularly for a light in a motor vehicle, with an angle bracket (9;109); which is slidable onto a wall section (16) of the mounting opening (2) with a holding receptacle (10), and with a light disk (5;105;205), Characterized in that, The light disk (5;105;205) is insertable into the remaining opening with the angle bracket (9;109) being slid on and in so that the inserted light disk (5;105;205) grips around the angle bracket (9;109) and also grips around a wall section (26) of the mounting opening (2) on an opposite side and the light disk (5;105;205) is elastically deformable at least in its section gripping around the angle bracket (9;109).

5. Light housing (1;101;201) for the installation in a mounting opening (2), particularly for a light in a motor vehicle, with an angle bracket (9;109), which is slidable onto a wall section (16) of the mounting opening (2) with a holding receptacle (10), and with a light disk (5;105;205), characterized in that, the light disk (5;105;205) is insertable into the remaining opening with the angle bracket (9;109) being slid on and in so that the inserted light disk (5;105;205) grips around the bracket (9;109) and also grips around a wall section (26) of the mounting opening (2) on an opposite side and the angle bracket (9:109) and/or the light disk (5;105;205) is a plastic part, in particular an injection molded part.

6. Light housing according to claim 1, characterized in that the light disk (5;105;205) is inserted into the remaining opening essentially without lateral clearance.

7. Light housing (1l;10;201) for the installation in a mounting opening (2), particularly for a light in a motor vehicle, with an angle bracket (9;109), which is slidable onto a wall section (16) of the mounting opening (2) with a holding receptacle (10), and with a light disk (5;105;205), Characterized in that, The light disk (5;105;205) is insertable into the remaining opening with the angle bracket (9;109) being slid on and in so that the inserted light disk (5;105;205) grips around the angle bracket (9;109) and also grips around a wall section (26) of the mounting opening (2) on an opposite side and the holding receptacle (10) of the angle bracket (9;109) is formed by an approximately u-shaped clamping clip.

8. Light housing (1;101;201) for the installation in a mounting opening (2), particularly for a light in a motor vehicle, with an angle bracket (9;109), which is slidable onto a wall section (16) of the mounting opening (2) with a holding receptacle (1), and with a light disk (5;105;205), characterized in that, the light disk (5;105;205) is insertable into the remaining opening with the angle bracket (9;109) being slid on and in so that the inserted light disk (5;105;205) grips around the angle bracket (9;109) and also grips around a wall section (26) of the mounting opening (2) on an opposite side and the holding receptacle (10) of the angle bracket (9;109) is formed elastically expandable.

9. Light housing (1;101;201) for the installation in a mounting opening (2), particularly for a light in a motor vehicle, with an angle bracket (9;109), which is slidable onto a wall section (16) of the mounting opening (2) with a holding receptacle (10), and with a light disk (5:105;205), Characterized in that, The light disk (5;105;205) is insertable into the remaining opening with the angle bracket (9;109) being slid on and in so that the inserted light disk (5;105;205) grips around the angle bracket (9;109) and also grips around a wall section (26) of the mounting opening (2) on an opposite side and the angle bracket (9) comprises a bearing frame (4), which, with the angle bracket (9) being slid on, abuts the inside (6) of the wall (headliner 3) with a frame section (4b) at least on its side opposite the holding receptacle (10).

10. Light housing according to claim 9, characterised in that the light disk (5) comprises a bearing surface (shoulder 19), with said bearing surface it abuts the frame section (4b) in its direction of insertion in its inserted state.

11. Light housing (1;101;201) for the installation in a mounting opening (2), particularly for a light in a motor vehicle, with an angle bracket (9;109), which is slidable onto a wall section (16) of the mounting opening (2) with a holding receptacle (10), and with a light disk (5;105;205), characterized in that, the light disk (5;105;205) is insertable into the remaining opening with the angle bracket (9;109) being slid on and in so that the inserted light disk (5;105;205) grips around the angle bracket (9;109) and also grips around a wall section (26) of the mounting opening (2) on an opposite side and the light disk (5;105;205) comprises a holding receptacle (18), with said holding receptacle the inserted light disk (5;105;205) grips around a wall section (26).

12. Light housing according to claim 11, characterised in that the holding receptacle (18) of the light disk (5;105) is formed by an approximately u-shaped clamping clip.

13. Light housing according to claim 11, characterised in that the holding receptacle (18) of the light disk (5;105;205) is formed elastically expandable.

14. Light housing (1) for the installation in a mounting opening (2), particularly for a light in a motor vehicle, with an angle bracket (9), which is slidable onto a wall section (16) of the mounting opening (2) with a holding receptacle (10), and with a light disk (5), characterised in that the light disk (5) is insertable into the remaining opening with the angle bracket (9) being slid on and in that the inserted light disk (5) grips around the angle bracket (9) and also grips around a wall section (26) of the mounting opening (2) approximately on the opposite side and in that a lamp socket for a lamp (15) is provided at the angle bracket (9) or at the light disk and in that a catch (24) is provided at the light disk (5), with said catch (24) the inserted light disk (5) grips behind the angle bracket (9) in its direction of insertion and in that the light disk (5) comprises a bearing surface (shoulder 22), with said bearing surface the inserted light disk (5) abuts the angle bracket (9) in its direction of insertion and in that the light disk (5) is elastically deformable at least in its section gripping around the angle bracket (9) and in that the holding receptacle (10) of the angle bracket (9) is formed by an approximately unshaped clamping clip and in that the angle bracket (9) comprises a bearing frame (4), which, with the angle bracket (9) being slid on, abuts the inside (6) of the wall (headliner 3) with a frame section (4b) at least on its side opposite the holding receptacle (10) and in that the light disk (5) comprises a bearing surface (shoulder 19), with said bearing surface it abuts the frame section (4b) in its direction of insertion in its inserted state and in that the light disk (5) comprises a holding receptacle (18), with said holding receptacle the inserted light disk (5) grips around a wall section (26).

* * * * *